U. S. LANDERS.
DEMOUNTABLE RIM.
APPLICATION FILED DEC. 9, 1915.
1,198,242. Patented Sept. 12, 1916.
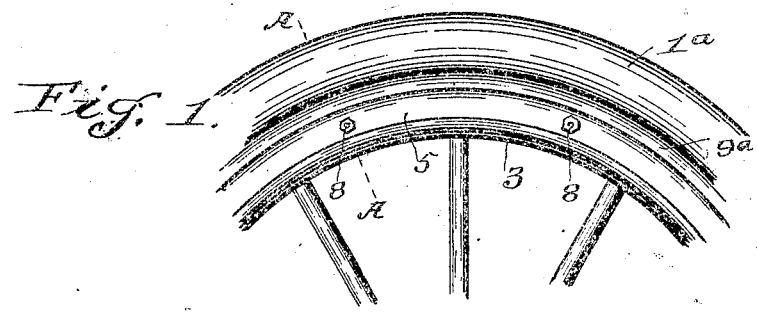
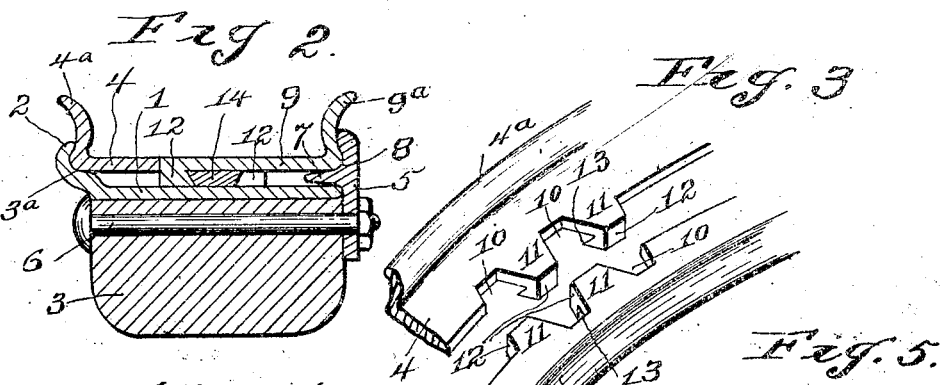
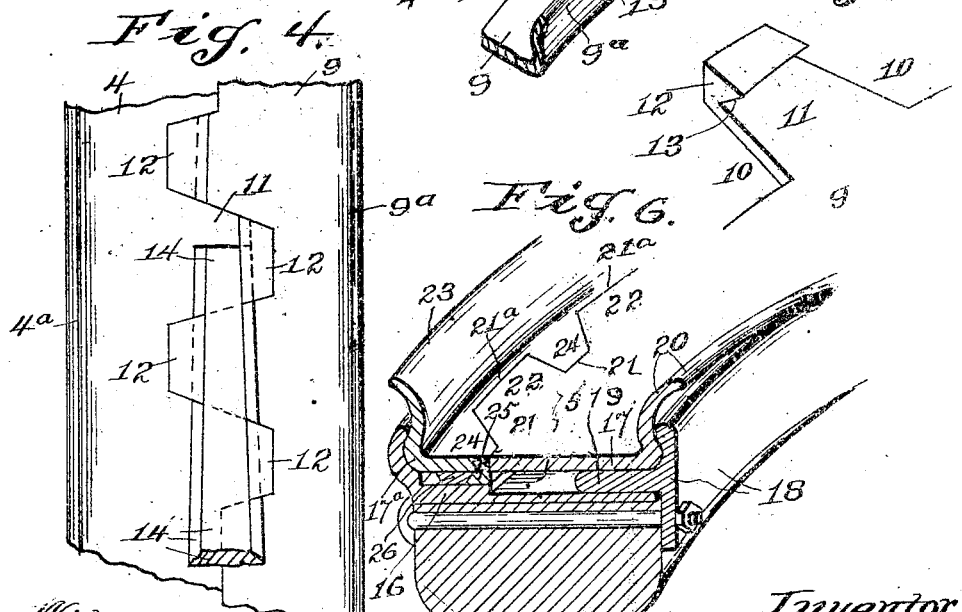
Witnesses:
R. F. Lansdale
W. F. Croseman
Inventor:
Upton S. Landers
By C. F. Bell
Attorney

UNITED STATES PATENT OFFICE.

UPTON S. LANDERS, OF BAKERSFIELD, CALIFORNIA.

DEMOUNTABLE RIM.

1,198,242.  Specification of Letters Patent.  Patented Sept. 12, 1916.

Application filed December 9, 1915. Serial No. 65,931.

*To all whom it may concern:*

Be it known that I, UPTON S. LANDERS, a citizen of the United States, residing at Bakersfield, in the county of Kern and State of California, have invented certain new and useful Improvements in Demountable Rims, of which the following is a specification.

This invention relates to automobile tires, and pertains especially to the class of demountable rims for connecting inflatable tires with wheel rims.

The object of the invention is to provide, in a demountable rim, certain novel improvements in this particular class of rims, and to furnish a specially constructed two part interlocking rim of simple and expeditious adaptability.

A further object of the invention is to provide novel and peculiar locking members in a two part demountable rim, and to furnish means coöperating with the locking members for retaining them in locked position.

Various other objects, advantages and improved results are attainable in the practical application of the invention as will be found in the specification and claims following.

In the accompanying drawings forming part of this application: Figure 1 is a side elevation of part of a wheel showing the application of the invention. Fig. 2 is an enlarged cross sectional view taken on the dotted line A—A, Fig. 1, and through one of the interlocking rim portions, with the tire removed. Fig. 3 is a detail perspective view showing an interlocking portion of the demountable rim unlocked. Fig. 4 is an inverted plan view of the interlocking portions with the key partly inserted. Fig. 5 is an inverted perspective view of one of the locking wings. Fig. 6 is a sectional perspective view of a modification.

The same reference characters denote the same parts throughout the several views of the drawings.

I am well aware that demountable rims having interlocking members, of various construction have been devised, and that various devices have been provided for keying or securing said members together, but my invention provides specially constructed locking members coöperating with special keys, affording a closer union of the members, and producing a continuous even smooth surface for the tire.

My invention further embodies simple and inexpensive construction and affords means for expeditious manipulation of the parts in producing a more durable, compact and efficient demountable rim.

With these purposes and objects in view, the invention will now be described in detail.

The permanent rim 1, having the usual side flange 2, is secured to the felly 3, in the ordinary manner, and said flange has a shoulder 3ª and forms a clamping support for one side or member 4, of the demountable rim. The other clamping support member comprises a plate ring 5, fitting and secured to the felly by means of suitable bolts 6, and said plate has a projecting annular flange 7 over-lapping the inner edge of the rim 1, and having a supporting shoulder 8, opposite the shoulder 3ª, for the other member 9, of the demountable rim. The said annular flange 7, projects inwardly between the rim 1 and the demountable rim member 9, so as to leave a space between the rim 1 and the members 4 and 9, for the purpose as will be hereinafter explained. The members 4 and 9 have flanges 4ª and 9ª respectively for the tire 1ª.

Each of the demountable rim members 4 and 9 have their meeting edges provided, at intervals throughout their circumference, with meshing portions of special construction so that said portions overlap flush with the inner and the outer faces of the members. In perfecting the meshing elements I form a plurality of V-shaped cut outs 10 in the meeting edges of the members 4 and 9, and these cut outs are separated by V-shaped wings 11, which fit the cut outs so that the wings and cut-outs of one rim member mesh with the wings and cut-outs of the other rim member crosswise of the rim. The end or point of each of the wings 11 is provided with a head 12 having an undercut edge 13 extending across the end of the under face of each wing. The undercut edges 13 are tapered lengthwise so as to receive a wedge shaped locking key 14 having beveled edges fitting the undercut edges 13, and thereby locking the demountable rim members 4 and 9 firmly and securely together. The heads 12 are preferably of a thickness equal to the space, hereinbefore referred to, between the demountable rim and the fixed rim 1, so that the heads with the keys will rest centrally upon the fixed rim 1, whereby the demountable rim is supported centrally as well as at the edges by the flange shoulders 3ª and 8.

Referring to the modification shown in Fig. 6, the fixed rim 15, has an annular enlargement or chair 16, forming a rest support for either the preferred form or for the modified form of demountable rim 17. The clamping side 18 has an annular flange 19 extending inwardly between the fixed rim and the rim 17, and forms a rest or support for this rim. The demountable rim 17 has a side flange 20 integral therewith, and an inner edge provided with alternate V-shaped notches 21 separated by a V-shaped wing 22. The side flange 23 of the rim member 17ª, has V-shaped wings 24 which fit the notches 21, and V-shaped openings 21ª for the wings 22. The wings have undercut heads 25 for a tapered beveled edge key 26.

It will be understood that the locking features of the demountable rims in either form are only necessary at certain intervals in the circumference of the rim, preferably at three places in the rim equally spaced apart which will produce the desired results. Obviously either form of demountable rim may be used on either form of fixed rim as desired or as occasion may demand, but for heavy vehicles or trucks the modified form of fixed rim is preferable as it affords a more substantial base or rest for the demountable rim.

I do not wish to be understood as limiting the invention to any particular size or material, nor to the number of interlocking members in the demountable rim, nor to the application of the demountable rim, but reserve the right to make such changes and alterations therein as may be found expedient in the manufacture and practical application of the invention as may come within the scope of the appended claims.

Having thus described my invention what I claim as new and desire to secure by Letters Patent is:—

1. A demountable tire-carrying rim comprising a pair of annular members having tooth-like meshing sections composed of V-shaped wings and V-shaped cut-outs, an enlarged head at the end of each wing and having a tapering undercut, said undercuts forming a keyway across the wings, and tapering locking keys for securing the members together.

2. A demountable tire-carrying rim comprising a pair of annular members, the contacting edge of each member having a plurality of alternating wedge shaped wings and cutouts assembled at intervals through the circumference of the rim, the wings wedging into the cut-outs crosswise of the rim, an enlarged head upon each wing and having an undercut inner edge, and a beveled key extending through the undercuts for locking the members together.

3. A demountable rim comprising two members each of which has sections thereof composed of V-shaped wings projecting in opposite directions from the adjacent edges of the members, the wings of one member meshing with the wings of the other member across the central circumference of the rim, an enlarged head on the outer end of each wing, said heads each having an undercut beveled face tapering lengthwise, one set of heads being separated by the wings of the other set, and a beveled edge tapering key fitting the undercuts and extending across the wings for locking the members together.

In witness whereof I hereunto set my hand in the presence of two witnesses.

UPTON S. LANDERS.

Witnesses:
M. S. HALL,
GEO. B. PARKER.